US009519088B2

(12) United States Patent
Juni et al.

(10) Patent No.: US 9,519,088 B2
(45) Date of Patent: Dec. 13, 2016

(54) MICROMIRROR ARRAY

(71) Applicant: NITTO DENKO CORPORATION, Ibaraki-shi, Osaka (JP)

(72) Inventors: Noriyuki Juni, Ibaraki (JP); Akiko Nagafuji, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

(21) Appl. No.: 14/379,904

(22) PCT Filed: Feb. 6, 2013

(86) PCT No.: PCT/JP2013/052678
§ 371 (c)(1),
(2) Date: Aug. 20, 2014

(87) PCT Pub. No.: WO2013/129043
PCT Pub. Date: Sep. 6, 2013

(65) Prior Publication Data
US 2016/0018573 A1 Jan. 21, 2016

(30) Foreign Application Priority Data

Feb. 29, 2012 (JP) .................................. 2012-043860
Jan. 30, 2013 (JP) .................................. 2013-015485

(51) Int. Cl.
*G02B 5/136* (2006.01)
*G02B 5/124* (2006.01)
(Continued)

(52) U.S. Cl.
CPC ............... *G02B 5/136* (2013.01); *G02B 5/122* (2013.01); *G02B 5/124* (2013.01); *G02B 27/2292* (2013.01); *G02B 5/045* (2013.01)

(58) Field of Classification Search
CPC ......... G02B 5/045; G02B 5/124; G02B 5/122; G02B 5/136; G02B 27/2292
(Continued)

(56) References Cited

U.S. PATENT DOCUMENTS 5,731,900 A   3/1998 Milner
8,540,371 B2  9/2013 Sugiyama
(Continued)

FOREIGN PATENT DOCUMENTS

CN    101405627 A    4/2009
CN    102221722 A    10/2011
(Continued)

OTHER PUBLICATIONS

Taiwanese Office Action mailing date Jul. 24, 2014, issued in corresponding Taiwanese Application No. 102104615. W/ English Translation (7 pages).
(Continued)

*Primary Examiner* — Thomas K Pham
*Assistant Examiner* — Marin Pichler
(74) *Attorney, Agent, or Firm* — Westerman, Hattori, Daniels & Adrian, LLP

(57) ABSTRACT

A micromirror array according to the present invention is a corner reflector type micromirror array capable of projecting a mirror image of an object to be projected sharply with high luminance. The micromirror array includes a substrate, and a plurality of unit optical elements (quadrangular prisms) formed in an array on the substrate. Each of the unit optical elements is of a protruding or recessed shape perpendicular to the surface of the substrate. The unit optical elements has two side surfaces orthogonal to each other on opposite sides of a corner of the side surfaces, and the two side surfaces are light reflecting surfaces. Each of the light reflecting surfaces is of a rectangular shape such that the ratio of the vertical
(Continued)

length thereof as measured in a substrate thickness direction to the horizontal width thereof as measured in a substrate surface direction is not less than 1.5.

4 Claims, 3 Drawing Sheets

(51) Int. Cl.
*G02B 5/122* (2006.01)
*G02B 27/22* (2006.01)
*G02B 5/04* (2006.01)

(58) Field of Classification Search
USPC ... 353/81, 99; 345/7, 32; 359/529–530, 627, 359/834, 836, 99, 32
See application file for complete search history.

(56) References Cited

U.S. PATENT DOCUMENTS

| | | |
|---|---|---|
| 8,730,308 B2 | 5/2014 | Maekawa |
| 2010/0073751 A1* | 3/2010 | Maekawa ............ G02B 5/124 359/203.1 |
| 2010/0214394 A1 | 8/2010 | Maekawa |
| 2010/0231860 A1 | 9/2010 | Maekawa |
| 2011/0267686 A1 | 11/2011 | Kageyama et al. |
| 2011/0285965 A1 | 11/2011 | Sugiyama |
| 2012/0050876 A1* | 3/2012 | Sugiyama ............ G02B 5/124 359/625 |
| 2012/0092766 A1 | 4/2012 | Maekawa et al. |
| 2012/0300310 A1 | 11/2012 | Maekawa et al. |

FOREIGN PATENT DOCUMENTS

| | | |
|---|---|---|
| JP | 2009-75483 A | 4/2009 |
| JP | 2011-191404 A | 9/2011 |
| JP | 2011-242729 A | 12/2011 |
| JP | 2012-247459 A | 12/2012 |
| WO | 2007/116639 A1 | 10/2007 |
| WO | 2010/131623 A1 | 11/2010 |

OTHER PUBLICATIONS

International Preliminary Report on Patentability (Chapter I of the Patent Cooperation Treaty) (Form PCT/IB/373) of international Application No. PCT/JP2013/052678 dated Sep. 2, 2014, with Forms PCT/ISA/237 and PCT/IB/338 (7 pages).
International Search Report dated Mar. 19, 2013, issued in corresponding application No. PCT/JP2013/052678.
Chinese Office Action dated Dec. 7, 2015, issued in corresponding Chinese Application No. 201380011206.8 W/ English Translation (10 pages).
Office Action dated Oct. 11, 2016, issued in Japanese Application No. 2013-015485, with English translation (7 pages).

* cited by examiner

RELATED ART

MICROMIRROR ARRAY

TECHNICAL FIELD

The present invention relates to a micromirror array which forms a mirror image of an object to be projected in space by means of unit optical elements arranged on a substrate, each having a pair of light reflecting surfaces orthogonal to each other.

BACKGROUND ART

A micromirror array in which multiple "unit optical elements each reflecting light by means of one or more mirror surfaces" are disposed on a substrate (base) constituting an element surface of an optical element has been developed as an image-forming optical element which image-forms a three-dimensional or two-dimensional object, image and the like. In particular, a micromirror array including a large number of recessed unit optical elements or protruding unit optical elements arranged in an array and each having "two mirror surfaces orthogonal to each other" (a pair of adjacent light reflecting surfaces constituting a right-angled corner; that is, a corner reflector) disposed at right angles or at an angle close to the right angles to this substrate has received attention in recent years because it is simple in structure and it is expected to reduce manufacturing costs (with reference to Patent Literatures 1 and 2).

Among such micromirror arrays, a "dihedral corner reflector array" uses a function such that light incident on one side of the aforementioned array is reflected twice between a pair of light reflecting surfaces constituting each unit optical element (corner reflector) when passing through an element surface (substrate), so that the light reflected twice (passing light) forms an image in a spatial position on the opposite side of the aforementioned array (symmetrical with respect to the plane of the element surface). For example, in the case of a protruding corner reflector array 20 in which a large number of transparent protruding cubes 11 (the ratio of length, width and height is approximately 1:1:1) protruding in the thickness direction of a substrate 2 (element surface P, shown by broken dot-dash line in FIGS. 1 to 4, element surface P is an imaginary plane passing through the center of the thickness of the substrate 2, parallel to the surface of the substrate 2) from one surface of the substrate 2 are arranged in a checkerboard pattern as shown in FIG. 4, at least two surfaces (in this example, a first side surface 11a and a second side surface 11b) among the four side surfaces of such a cube 11 are formed as mirror surfaces (light-reflective side surfaces), so that the aforementioned protruding corner reflector array 20 is capable of forming a mirror image (reversed image) of an object to be projected as an aberration-free real image (erect image) in space thereabove [that is, in space on the side of the eyepoint of an observer (hollow arrow E)], as shown in FIG. 5.

The aforementioned protruding corner reflector array 20 is based on the aforementioned principles. Thus, each cube 11 protruding from the surface of the aforementioned substrate 2 is disposed, with the upper surface (sides of the upper surface) of each cube 11 rotated 45 degrees with respect to the observer so that a right-angled corner (corner 11c) constituting the protruding corner reflector faces toward the front of the observer, as shown in FIGS. 4 and 5. Also, the unit optical elements (cubes 11) constituting the aforementioned protruding corner reflector array 20 are arranged in a diagonal checkerboard pattern as seen from the observer.

CITATION LIST

Patent Literature

PTL 1: International Publication No. WO2007/116639
PTL 2: Japanese Published Patent Application No. 2011-191404

SUMMARY OF INVENTION

In the corner reflector type micromirror array, there are cases where stray light (multiply-reflected light) or the like is generated in the light passing through the aforementioned element surface due to light reflection from regions (in FIG. 4, a "third side surface (mirror surface) $11d$" and a "fourth side surface (mirror surface) $11e$" which are opposed to the first side surface $11a$ and the second side surface $11b$) other than the "light reflecting surfaces involved in image formation".

Also, the amount of light usable for image formation is limited in the conventional micromirror arrays because of their structural constraints. Thus, there is apprehension that the resultant formed image (the mirror image as seen from the observer) is dark and faint. In this regard, there has been room for improvement.

In view of the foregoing, it is therefore an object of the present invention to provide a corner reflector type micromirror array which is capable of projecting a mirror image of an object to be projected sharply with high luminance.

To accomplish the aforementioned object, a micromirror array according to the present invention includes: a flat-shaped substrate; and a plurality of unit optical elements formed in an array on this substrate, said micromirror array forming a mirror image of an object to be projected which is disposed on a first surface side of said substrate in space lying on a second surface side opposite from said first surface side, each of said unit optical elements being of a protruding or recessed shape perpendicular to the surface of said substrate, each of the protruding or recessed unit optical elements having two side surfaces orthogonal to each other on both sides of a corner of the side surfaces, said two side surfaces being formed as light reflecting surfaces, each of the light reflecting surfaces being of a rectangular shape such that the ratio of the vertical length thereof as measured in a substrate thickness direction to the horizontal width thereof as measured in a substrate surface direction is not less than 1.5.

The present inventors have focused attention on the fact that there are cases where projected images are darkened in conventional corner reflector type micromirror arrays. Then, the present inventors have inferred that a cause of the aforementioned "darkening" phenomenon is related to the area of the mirror surfaces (light reflecting surfaces) from which light transmitted through the element surface is reflected once each (twice in total), and have made studies. As a result, the present inventors have found that the aspect ratio [the ratio of the vertical length (the length as measured in a substrate thickness direction) to the horizontal width (the width as measured in a substrate surface direction)] of the light reflecting surfaces is important for the increase in the amount of light reflected from the light reflecting surfaces and that the aforementioned aspect ratio which has been "approximately 1" for corner reflectors of a conventional cubic shape (having a length-to-width ratio of approximately 1) is controlled to be "not less than 1.5" to increase the effective light reflecting area of the light reflecting surfaces, which in turn increases the amount of light involved in the aforementioned image formation to provide a formed image (mirror image) that is sharp and high in luminance. Hence, the present inventors have attained the present invention. It should be noted that the element surface is an imaginary plane passing through the center of the thickness of the substrate, parallel to the surface of the substrate.

As described above, each of the unit optical elements constituting the micromirror array according to the present invention is a corner reflector having two light reflecting surfaces (side surfaces) orthogonal to each other, and each of the light reflecting surfaces is of a rectangular shape such that the "ratio of the vertical length thereof as measured in the substrate thickness direction to the horizontal width thereof as measured in the substrate surface direction" (that is, "aspect ratio") is not less than 1.5. This increases the amount of light reflected from each of the aforementioned light reflecting surfaces (once each) and transmitted toward the opposite side of the element surface (the amount of light involved in image formation) in the micromirror array according to the present invention. Thus, the micromirror array according to the present invention is capable of forming a mirror image of an object to be projected which is sharp and high in luminance, as compared with a conventional micromirror array.

In particular, the micromirror array according to the present invention wherein each of the light reflecting surfaces of the unit optical elements is of a rectangular shape such that the ratio of the vertical length thereof as measured in the substrate thickness direction to the horizontal width thereof as measured in the substrate surface direction is in the range of 1.5 to 5.0 is capable of forming a mirror image of an object to be projected which is sharper and higher in luminance.

In the case where the "ratio of the vertical length thereof as measured in the substrate thickness direction to the horizontal width thereof as measured in the substrate surface direction" (aspect ratio) of the light reflecting surfaces (side surfaces) of the unit optical elements is less than 1.5, the mirror image of the aforementioned object to be projected is tend to be dark and faint. Also, when the aforementioned aspect ratio exceeds 5.0, it tends to be difficult to obtain the effect of improving the luminance. The reason therefor is not known exactly, but it is inferred that the increase in stray light and the like makes the mirror image faint. Further, the light reflecting surfaces having an aspect ratio exceeding 5.0 have difficulties in shaping and tend to be lower in working accuracy.

DESCRIPTION OF EMBODIMENTS

Next, an embodiment according to the present invention will now be described in detail with reference to the drawings.

Figure 1:
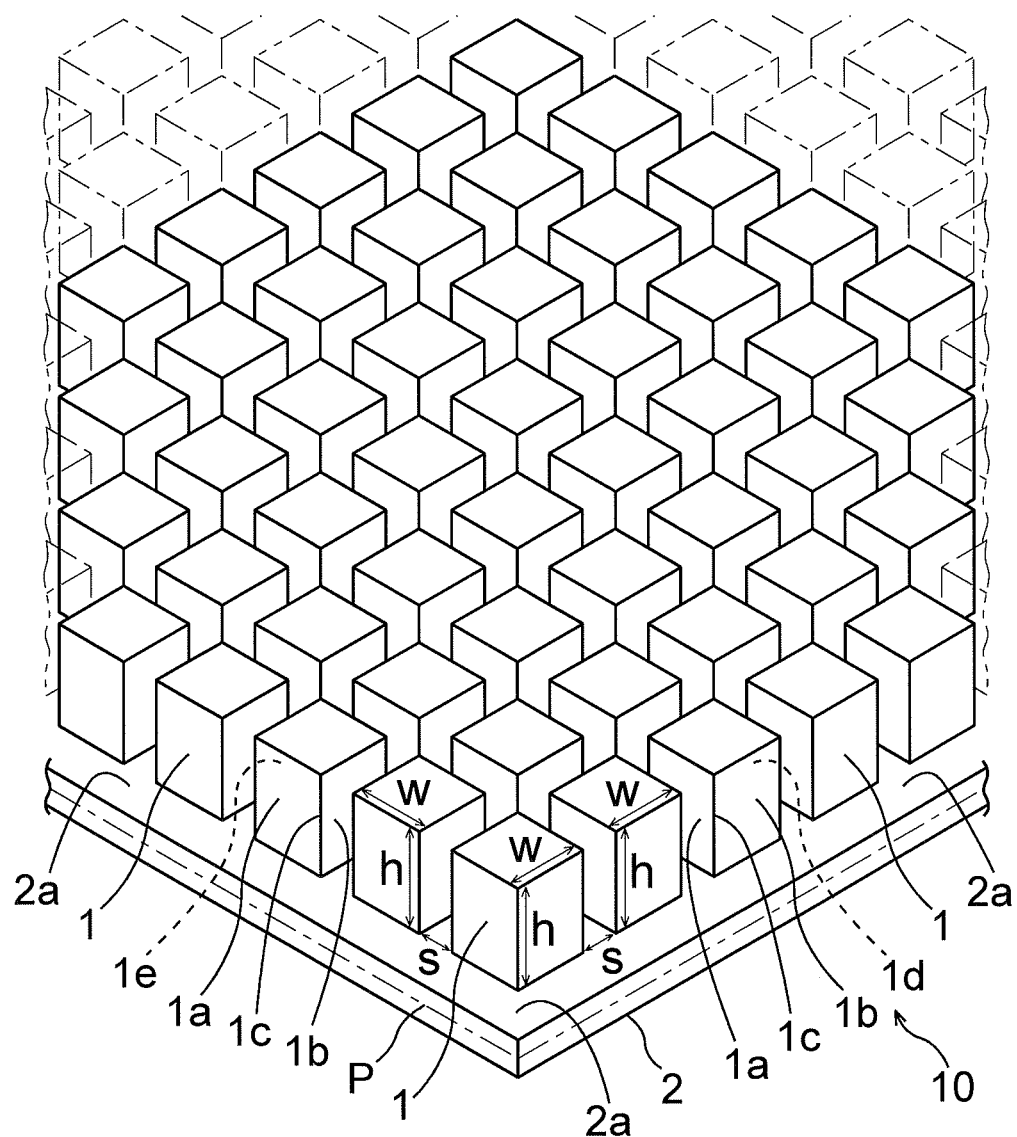
FIG. 1 is a perspective view showing a surface structure of a micromirror array according to an embodiment of the present invention.
Figure 2:
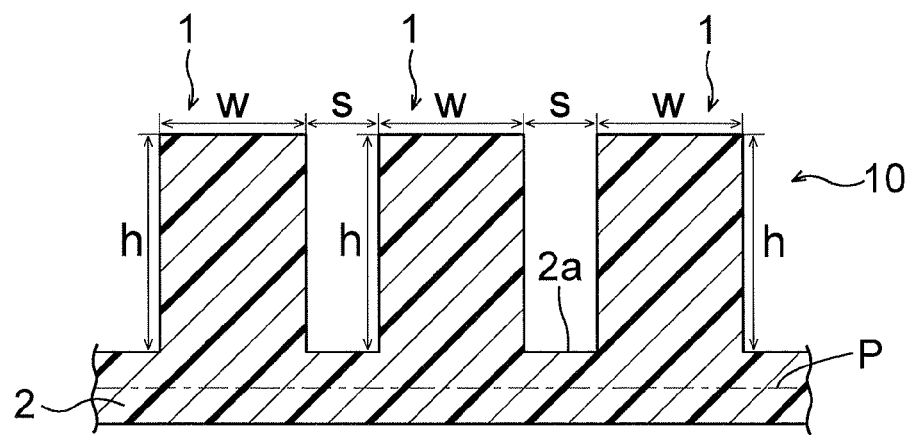
FIG. 2 is a partial sectional view as seen in the direction of the arrangement of unit optical elements in the micromirror array according to the embodiment of the present invention.

FIG. 1 is a perspective view showing a surface structure of a micromirror array according to the embodiment of the present invention. FIG. 2 is a partial sectional view showing the side surface (sectional) configuration of unit optical elements in the aforementioned micromirror array as seen in the direction of the arrangement of the unit optical elements.

The micromirror array (10) according to the present embodiment is a protruding corner reflector array 10 including a flat-shaped substrate 2, and a plurality of protruding unit optical elements (quadrangular prisms 1 in the shape of a rectangular parallelepiped) formed in an array on one surface (upper surface) of this substrate 2 (element surface P, indicated by broken dot-dash line), as shown in FIG. 1. In each of the aforementioned quadrangular prisms 1, a pair of (two) light reflecting surfaces (a first side surface 1a and a second side surface 1b on the lateral sides of each quadrangular prism 1) constituting a corner reflector are formed to have a rectangular shape such that the "ratio of the vertical length (height h) thereof as measured in a substrate thickness direction to the horizontal width (width w) thereof as measured in a substrate surface direction" [referred to hereinafter as an "aspect ratio (h/w)"] is not less than 1.5. This is a characteristic of the protruding corner reflector array 10 according to the present invention.

The aforementioned protruding corner reflector array 10 will be described in further detail. The substrate 2 and the quadrangular prisms 1 (in the shape of a rectangular parallelepiped) are formed integrally using transparent resin, as shown in the sectional view of FIG. 2. A resin which is easily shaped by heat and the like (thermoplastic resin) and which allows the optical element after a shaping operation to have a visible light transmittance of not less than 80%, such as acrylic resin, for example, is selected as the resin used for the array 10. Examples of the shaping operation used herein include casting with a metal mold, and a method in which cutting (dicing and the like) is performed after shaping into a flat shape. In particular, dicing is preferably used. The term "dicing" used herein refers to an engraving operation using a dicing saw (cutting edge). In particular, a method of digging linear grooves in a base material by using a circular rotary blade is preferably used.

The aforementioned substrate 2 is a support for the arrangement of the aforementioned quadrangular prisms 1 (unit optical elements) in an array. In general, the substrate 2 is a flat plate having a fixed thickness (a thickness on the order of 0.5 to 10.0 mm), and constitutes the element surface P (indicated by broken dot-dash line in the figures) of an optical element. It should be noted that this substrate 2 is also made of a transparent resin material which provides a visible light transmittance of not less than 80% after the shaping operation, as stated above.

Each of the aforementioned quadrangular prisms 1 (unit optical elements) is in the shape of a vertically elongated quadrangular prism (tubular shape) protruding from one surface (upper surface 2a) of the aforementioned substrate 2. The side surfaces (the first and second side surfaces 1a and 1b, and third and fourth side surfaces 1d and 1e which are opposed to the first and second side surfaces 1a and 1b) of each quadrangular prism 1 are formed so as to be erected at right angles or at an angle (approximately 90°±1.0°) close to the right angles from the surface (in the figure, the upper surface 2a) of the aforementioned substrate 2. The two side surfaces (the first side surface 1a and the second side surface 1b) together forming one corner (a corner 1c in FIG. 1) among the side surfaces of each quadrangular prism 1 have outside surfaces (and corresponding inside surfaces) which are light-reflective mirror surfaces. This corner 1c serves as a corner reflector.

It is desirable to improve the smoothness of these light-reflective side surfaces (the aforementioned first and second side surfaces 1a and 1b) by mirror finishing such as polishing, for the purpose of increasing light reflection efficiency. Also, a light-reflective coating (metallic coating and the like) may be formed on the outside surfaces of the first and second side surfaces 1a and 1b for the purpose of improving the light reflection efficiency of the aforementioned first and second side surfaces 1a and 1b.

As stated above, the light reflecting surfaces (the first and second side surfaces 1a and 1b) of the aforementioned quadrangular prisms 1 are formed to have a rectangular shape such that the aforementioned aspect ratio (h/w) is not less than 1.5. Further, the height h of the first and second side surfaces 1a and 1b (that is, the amount of protrusion of the aforementioned quadrangular prisms 1 from the substrate 2) is generally not less than 200 μm, preferably not less than 250 μm, and more preferably not less than 300 μm. The increase in the area of the first and second side surfaces 1a and 1b allows light incident from a lower or upper surface on the aforementioned quadrangular prisms 1 (unit optical elements) to be reflected in greater amounts and to be reflected (transmitted) toward the opposite side. It is desirable that the aspect ratio (h/w) of the aforementioned light reflecting surfaces (the first and second side surfaces 1a and 1b) is generally not less than 1.5, preferably not less than 2.0, and more preferably not less than 2.5. However, it is preferable that the maximum value of the aspect ratio (h/w) is limited to 5.0 or less in consideration of the workability and working accuracy of the aforementioned quadrangular prisms 1 (unit optical elements), and the like.

The width w of the side surfaces of the quadrangular prisms 1 in the aforementioned protruding corner reflector array 10 is generally 50 to 300 μm, and the spacing s between adjacent ones of the quadrangular prisms 1 is generally 10 to 200 μm. In general, the smaller width w of the side surfaces of the quadrangular prisms 1 achieves image formation with higher definition, but results in a smaller area of the individual side surfaces (mirror surfaces) involved in light reflection. This results in tendencies toward the decrease in the total amount of light that can be reflected and the decrease in the luminance of a mirror image.

Also, the third and fourth side surfaces 1d and 1e of the quadrangular prisms 1, which are not involved in the reflection of light incident from the lower or upper surface of the aforementioned protruding corner reflector array 10, are rough surfaces which are less capable of reflecting light (which do not totally reflect light) in the case of this example. It should be noted that the surfaces (the third and fourth side surfaces 1d and 1e) which are not involved in the reflection of light are not particularly limited to the rough surfaces but may be mirror surfaces (light reflecting surfaces).

In the aforementioned protruding corner reflector array 10, the aforementioned first and second side surfaces 1a and 1b constituting the corner reflector are formed as the light reflecting surfaces (mirror surfaces) having an aspect ratio (h/w) of not less than 1.5 to thereby increase the amount of light reflected from these light reflecting surfaces and transmitted toward the opposite side of the element surface P (indicated by broken dot-dash line). Thus, the protruding corner reflector array 10 according to the present embodiment is capable of forming a mirror image of an object to be projected which is sharp and high in luminance, as compared with a conventional protruding corner reflector array (20) including the unit optical elements in the shape of cubes (aspect ratio=1).

An instance in which the shape of the unit optical elements constituting the protruding corner reflector array 10 is the quadrangular prism 1 (in the shape of a rectangular parallelepiped) having a height h of not less than 200 μm and a height h/horizontal width w (aspect ratio) of not less than 1.5 is illustrated in the aforementioned embodiment. However, it is only necessary that both the first side surface 1a and the second side surface 1b constituting the corner reflector in each unit optical element according to the present invention have "an aspect ratio (h/w) of not less than 1.5 (or in the range of 1.5 to 5.0)". Other surfaces which are not involved in the image formation of a mirror image may be of any shape. For example, the upper surface (top surface) of each of the quadrangular prisms 1 may be inclined so that the aforementioned third and fourth side surfaces 1d and 1e are in the shape of trapezoids. These third and fourth side surfaces 1d and 1e may be combined together to provide a single triangular prism.

Also, an instance in which the unit optical elements constituting the protruding corner reflector array 10 are of the same shape [an aspect ratio (h/w) of not less than 1.5] in the entire region on the substrate 2 is illustrated in the aforementioned embodiment. However, it is not always necessary that all of the unit optical elements on the aforementioned substrate 2 are of the same shape. For example, the protruding corner reflector array 10 may be a protruding corner reflector array in which some of the unit optical elements (in the shape of quadrangular prisms) positioned on a peripheral portion of the aforementioned substrate 2 have an aspect ratio (h/w) of less than 1.5, a protruding corner reflector array in which the unit optical elements (1) in the shape of the aforementioned quadrangular prisms and the unit optical elements in the shape of the aforementioned triangular prisms are present in a mixed manner, a recessed corner reflector array in which some or all of the unit optical elements are recessed corner reflectors, or the like. The present invention includes a configuration in which some of the unit optical elements on the substrate (element surface) are "corner reflectors each having a pair of light reflecting surfaces (side surfaces) having an aspect ratio (h/w) of not less than 1.5".

Next, inventive examples in which the aforementioned protruding corner reflector array is produced will be described in conjunction with a comparative example. It should be noted that the present invention is not limited to the inventive examples to be described below.

EXAMPLES

In Examples to be described below, a transparent acrylic board was used to produce several types of protruding corner reflector arrays (Inventive Examples 1 to 7 and Comparative Example 1) different from each other in "ratio of height (h) as measured in a substrate thickness direction to horizontal width (w) as measured in a substrate surface direction" (aspect ratio) of unit optical elements. Also, using these protruding corner reflector arrays, a comparison was made between the brightnesses (luminances) of mirror images (spatial images) in the case where a predetermined image displayed on a liquid crystal display (LCD) was projected. In Inventive Examples according to the present invention, the "aspect ratio of light reflecting surfaces" is represented by h/w in a manner similar to the aspect ratio of the aforementioned unit optical elements because each of the aforementioned unit optical elements is a quadrangular prism (a rectangular parallelepiped) perpendicular to the substrate.

First, the acrylic board was prepared, and the protruding corner reflector arrays in Inventive Examples 1 to 7 and Comparative Example 1 were produced by dicing (cutting).

[Acrylic Board]

A substrate made of acrylic resin (flat board): 50 mm×50 mm×2 mm in thickness.

[Projection of Protruding Corner Reflector Arrays]

The aforementioned acrylic board was affixed to an adhesive tape <dicing tape: ELEP manufactured by Nitto Denko Corporation> and fixed thereto. In that state, the resultant structure obtained by fixing the aforementioned acrylic board was set on a chuck table of a dicing device <manufactured by DISCO Corporation>. Then, grooves having a depth of 100 to 350 μm [different depending on Inventive and Comparative Examples and corresponding to the height of the aforementioned quadrangular prism (the amount of protrusion) and "the height h of the light reflecting surfaces"] were engraved (dug) in a predetermined lattice form under conditions shown in [Dicing Conditions] to be described later, so that the protruding corner reflector arrays in Inventive Examples 1 to 7 and Comparative Example 1 as shown in FIG. 1 were obtained. The "height h", the "width w" and the aspect ratio (h/w) of the unit optical elements (light reflecting surfaces) of the obtained protruding corner reflector arrays are listed in "Table 1" to be described later.

Figure 4:
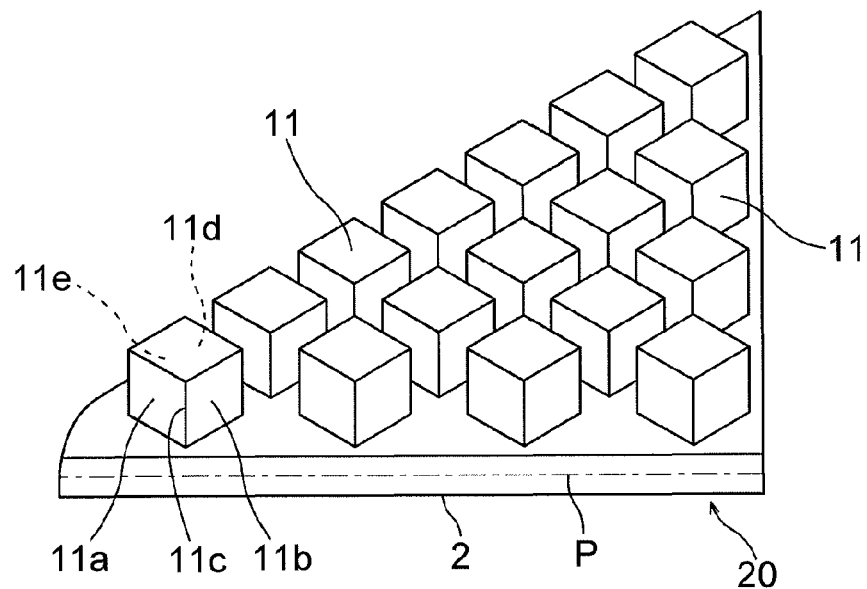
FIG. 4 is a perspective view showing a surface structure of a conventional micromirror array.
Figure 5:
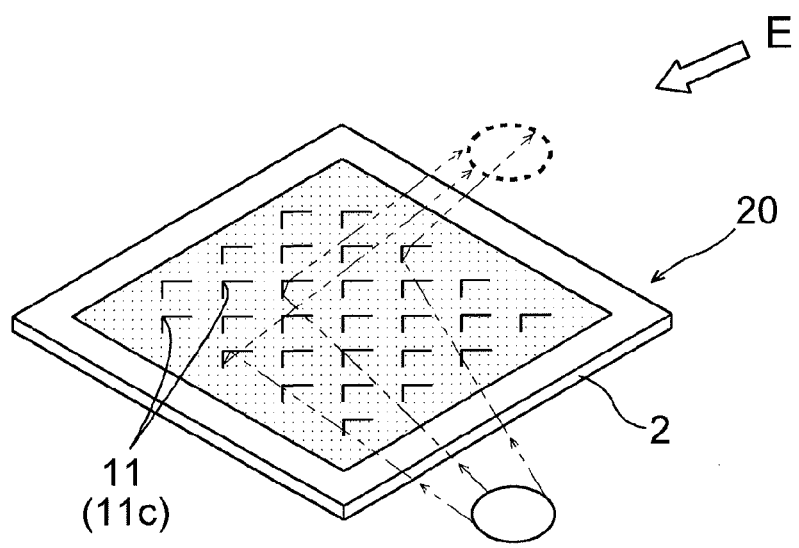
FIG. 5 is a schematic view illustrating how a mirror image is formed by a micromirror array.

Cubic unit optical elements having an aspect ratio (h/w) of "1" (corresponding to the related art of FIG. 4) are used as a sample of "Comparative Example 1". As a result of observation and measurement of the produced protruding corner reflector arrays by using a microscope <VHX-200 manufactured by Keyence Corporation> and a laser microscope <VK-9700 manufactured by Keyence Corporation>, one side (corresponding to the "horizontal width w of the light reflecting surfaces") of the square of the upper surface of each unit optical element (quadrangular prism) was 100 μm, and the distance s between adjacent ones of the unit optical elements was 30 μm.

[Dicing Conditions]

Dicing blade <NBC-Z2050 manufactured by DISCO Corporation> with a thickness of 25 μm.
Spindle rpm: 30000 rpm.
Table feed speed: 3.0 mm/sec.
Cooling: shower cooler (water) 1 L/min, and shower nozzle (water) 0.5 L/min.

[Brightness Measurement of Mirror Image (Spatial Image)]

Figure 3:
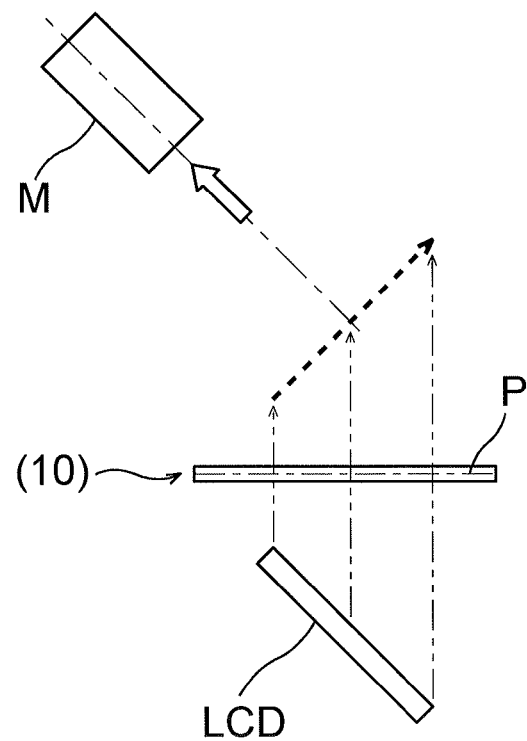
FIG. 3 is a schematic view illustrating a method of measuring the luminance of a mirror image according to an example of the present invention.

The protruding corner reflector array (10) obtained in each of Inventive Examples 1 to 7 and Comparative Example 1 was set horizontally, as shown in FIG. 3, and the LCD was disposed at an inclined angle of 45° in a predetermined position under the protruding corner reflector array (10). Then, an evaluation image (a white square measuring 1 cm×1 cm) of a predetermined luminance was displayed on the aforementioned LCD. The brightness (luminance) of a mirror image (indicated by a dotted line in the figure) projected in a spatial position symmetrical to the evaluation image with respect to the plane of the element surface P (indicated by broken dot-dash line) was measured from above at a distance of 50 cm from the mirror image at a downward angle of 45° in opposed relation to the mirror image. The measurement of the brightness of the aforementioned mirror image was made in a darkroom. A luminance meter M<BM-9 manufactured by Topcon Corporation> was used for the measurement of the brightness of the mirror image.

[Evaluation of Visual Recognizability of Mirror Image (Character)]

Following the aforementioned "brightness measurement of the mirror image", an evaluation image (black Kanji characters for "Nitto Denko" in Ming-style type (Mincho typeface) each measuring 2 cm×2 cm on a white background) of a predetermined luminance was displayed on the aforementioned LCD by using a similar arrangement (with reference to FIG. 3). A mirror image (indicated by the dotted line in the figure) projected in the spatial position symmetrical to the evaluation image with respect to the plane of the element surface P (indicated by broken dot-dash line) was visually observed from above at a distance of 50 cm from the mirror image at a downward angle of 45° in opposed relation to the mirror image. The evaluation of the visual recognizability of the aforementioned mirror image was performed under a fluorescent light (300 lux or more) in a room. The evaluation is as follows: a mirror image which was visually recognizable as characters was indicated by an open circle "○"; and a mirror image which was not visually recognizable as characters was indicated by a cross "x".

The results of the aforementioned measurement are shown in "Table 1" below.

TABLE 1

|  | Inv. Ex. 1 | Inv. Ex. 2 | Inv. Ex. 3 | Inv. Ex. 4 | Inv. Ex. 5 | Inv. Ex. 6 | Inv. Ex. 7 | Comp. Ex. 1 |
|---|---|---|---|---|---|---|---|---|
| Width w (μm) of Light Reflecting Surfaces (Unit Optical Elements) | 100 | 100 | 150 | 70 | 100 | 150 | 150 | 100 |
| Height h (μm) of Light Reflecting Surfaces (Unit Optical Elements) | 300 | 200 | 300 | 150 | 150 | 400 | 600 | 100 |
| Aspect Ratio (h/w) | 3.0 | 2.0 | 2.0 | 2.14 | 1.5 | 2.67 | 4.0 | 1.0 |
| Brightness (Luminance) (cd/m$^2$) | 1.6 | 1.1 | 1.1 | 0.9 | 0.5 | 1.6 | 0.5 | 0.2 |

TABLE 1-continued

|  | Inv. Ex. 1 | Inv. Ex. 2 | Inv. Ex. 3 | Inv. Ex. 4 | Inv. Ex. 5 | Inv. Ex. 6 | Inv. Ex. 7 | Comp. Ex. 1 |
|---|---|---|---|---|---|---|---|---|
| Visual Recognizability (Character Image) | ○ | ○ | ○ | ○ | ○ | ○ | ○ | x |

The aforementioned results of "brightness (luminance)" in "Table 1" showed that the higher the aspect ratio (h/w) of the unit optical elements (light reflecting surfaces) (Inventive Example 5→Inventive Examples 2, 3 and 4→Inventive Examples 1 and 6) in the range of 1 (Comparative Example 1) to 3 (Inventive Example 1), the more improved the brightness (luminance) of the aforementioned mirror image. Also, in Comparative Example 1 in which the aforementioned luminance was 0.2 cd/m², the characters in the image were not able to be recognized. In Inventive Examples 4 and 5 in which the aforementioned luminance was 0.5 to 0.9 cd/m², the characters in the image were able to be recognized but were displayed in light color and were illegible. On the other hand, in Inventive Examples 2 and 3 in which the aforementioned luminance was 1.1 cd/m², the characters were slightly light in color (slightly low in contrast) but were easily legible. In Inventive Examples 1 and 6 in which the aforementioned luminance was 1.6 cd/m², the characters were clearly legible. The visual recognizability of the image (characters) is dependent on the ambient environment (brightness) and resolution, and hence cannot be defined unconditionally. It was, however, found from the aforementioned results that the luminance (absolute value) of the mirror image (projected image) was preferably not less than 0.5 cd/m², and more preferably not less than 1.0 cd/m².

"Table 2" and "Table 3" below are those in which Inventive Examples having the same "width w of the light reflecting surfaces" in "Table 1" described above are rearranged for ease of comparison.

TABLE 2

|  | Inv. Ex. 5 | Inv. Ex. 2 | Inv. Ex. 1 |
|---|---|---|---|
| Width w (μm) of Light Reflecting Surfaces (Unit Optical Elements) | 100 | 100 | 100 |
| Height h (μm) of Light Reflecting Surfaces (Unit Optical Elements) | 150 | 200 | 300 |
| Aspect Ratio (h/w) | 1.5 | 2.0 | 3.0 |
| Brightness (Luminance) (cd/m²) | 0.5 | 1.1 | 1.6 |
| Visual Recognizability (Character Image) | ○ | ○ | ○ |

TABLE 3

|  | Inv. Ex. 3 | Inv. Ex. 6 | Inv. Ex. 7 |
|---|---|---|---|
| Width w (μm) of Light Reflecting Surfaces (Unit Optical Elements) | 150 | 150 | 150 |
| Height h (μm) of Light Reflecting Surfaces (Unit Optical Elements) | 300 | 400 | 600 |
| Aspect Ratio (h/w) | 2.0 | 2.67 | 4.0 |
| Brightness (Luminance) (cd/m²) | 1.1 | 1.6 | 0.5 |
| Visual Recognizability (Character Image) | ○ | ○ | ○ |

In the case of Inventive Examples having the same "width w of the light reflecting surfaces", it is found also from "Table 2" described above that the higher the aspect ratio (h/w), the more improved the brightness (luminance) of the aforementioned mirror image. It is also found that "Table 3" (width w=150 μm) is improved in luminance on the whole in the range of the aspect ratio (h/w) of not greater than 3 (Inventive Examples 3 and 6) because "Table 3" is greater in width (the width of the light reflecting surfaces) than "Table 2" (width w=100 μm), and that the higher the aspect ratio (h/w) in "Table 3" [Inventive Example 3 (h/w=2.0)→Inventive Example 6 (h/w=2.67)], the more improved the luminance, as in "Table 2". However, when attention is given to the fact that the luminance in Inventive Example 7 (h/w=4.0) in "Table 3" is lower than that in Inventive Example 6 (1.6→0.5), it can be considered that an excessively high aspect ratio results in the decrease in luminance due to the influence of the increase in stray light and the like, as mentioned above. It is hence desirable that the maximum value (preferable range) of the aforementioned aspect ratio (h/w) is limited to 5.0 or less.

Although specific forms in the present invention have been described in the aforementioned embodiment and examples, the aforementioned embodiment and examples should be considered as merely illustrative and not restrictive. It is contemplated that various modifications evident to those skilled in the art could be made without departing from the scope of the present invention.

The corner reflector type micromirror array according to the present invention is capable of projecting a mirror image of an object to be projected sharply with high luminance, and may be used for various display devices, input devices which operate in association with spatial images, projection devices which display merchandise in space and the like.

REFERENCE SIGNS LIST

1 Quadrangular prism
1a First side surface
1b Second side surface
1c Corner
2 Substrate

The invention claimed is:

1. A micromirror array comprising:
   a flat-shaped substrate; and
   a plurality of unit optical elements formed in an array on said substrate, said micromirror array capable of forming a mirror image of an object to be projected which is disposed on a first surface side of said substrate in space lying on a second surface side opposite from said first surface side,
   wherein each of said unit optical elements has a protruding or recessed shape perpendicular to the surface of said substrate, and has two side surfaces orthogonal to each other on opposite sides of a corner of the two side surfaces, and
   wherein said two side surfaces are light reflecting surfaces having a rectangular shape such that the ratio of the vertical length of the light reflecting surfaces as measured in a substrate thickness direction to the horizontal width of the light reflecting surfaces as measured in a substrate surface direction is in the range of 2.5 to 3.0.

2. The micromirror array according to claim 1, wherein each of said light reflecting surfaces of said unit optical elements has a rectangular shape such that the ratio of the vertical length of the light reflecting surfaces as measured in the substrate thickness direction to the horizontal width of the light reflecting surfaces as measured in the substrate surface direction is in the range 2.67 to 3.0.

3. The micromirror array according to claim 1, wherein luminance of the mirror image as measured at a downward angle of 45° and distance of 50 cm from the mirror image is not less than 2.5 times of luminance when the ratio of the vertical length of the light reflecting surfaces as measured in the substrate thickness direction to the horizontal width of the light reflecting surfaces as measured in the substrate surface direction is 1.0.

4. The micromirror array according to claim 1,
   wherein each of said light reflecting surfaces of said unit optical elements has a rectangular shape such that the ratio of the vertical length of the light reflecting surfaces as measured in the substrate thickness direction to the horizontal width of the light reflecting surfaces as measured in the substrate surface direction is in the range of 2.67 to 3.0, and
   wherein luminance of the mirror image as measured at a downward angle of 45° and distance of 50 cm from the mirror image is in a range of 2.5 to 8 times of luminance when the ratio of the vertical length of the light reflecting surfaces as measured in the substrate thickness direction to the horizontal width of the light reflecting surfaces as measured in the substrate surface direction is 1.0.

* * * * *